US012610385B2

(12) United States Patent (10) Patent No.: US 12,610,385 B2
Yoshida et al. (45) Date of Patent: Apr. 21, 2026

(54) VEHICLE COMMUNICATION CONTROL DEVICE, SYSTEM, AND METHOD

(71) Applicant: TOYOTA JIDOSHA KABUSHIKI KAISHA, Toyota (JP)

(72) Inventors: Kaoru Yoshida, Nisshin (JP); Kanade Kuriyama, Toyota (JP); Masataka Okuda, Toyota (JP); Masatoshi Kakutani, Miyoshi (JP); Toshiki Shinohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 437 days.

(21) Appl. No.: 18/200,182

(22) Filed: May 22, 2023

(65) Prior Publication Data

US 2024/0040600 A1 Feb. 1, 2024

(30) Foreign Application Priority Data

Aug. 1, 2022 (JP) ................................. 2022-122572

(51) Int. Cl.
*H04W 72/50* (2023.01)
*H04W 72/04* (2023.01)
*H04W 72/566* (2023.01)

(52) U.S. Cl.
CPC ......... *H04W 72/535* (2023.01); *H04W 72/04* (2013.01); *H04W 72/566* (2023.01)

(58) Field of Classification Search
CPC .. H04W 72/535; H04W 72/566; H04W 72/04
See application file for complete search history.

(56) References Cited

U.S. PATENT DOCUMENTS

| | | | | |
|---|---|---|---|---|
| 10,965,529 | B2 * | 3/2021 | Magzimof | ............ H04W 16/10 |
| 11,546,795 | B2 * | 1/2023 | Jung | ................ H04W 28/0268 |
| 2020/0314684 | A1 * | 10/2020 | Reimann | ................ H04L 67/61 |
| 2021/0168805 | A1 * | 6/2021 | Koh | ........................ H04W 28/16 |
| 2021/0314750 | A1 * | 10/2021 | Nguyen | .................. H04W 4/46 |
| 2023/0160718 | A1 * | 5/2023 | Adachi | .................. G16Y 10/40 |
| | | | | 701/450 |
| 2023/0284023 | A1 * | 9/2023 | Mitani | .................. H04W 12/00 |
| | | | | 726/26 |
| 2024/0003700 | A1 * | 1/2024 | Son | .................... G01C 21/3638 |

FOREIGN PATENT DOCUMENTS

| | | | |
|---|---|---|---|
| JP | 2009-188883 | A | 8/2009 |
| JP | 2014-003355 | A | 1/2014 |
| JP | 6861916 | B1 | 4/2021 |

\* cited by examiner

*Primary Examiner* — Sujoy K Kundu
*Assistant Examiner* — Weibin Huang
(74) *Attorney, Agent, or Firm* — Oliff PLC

(57) ABSTRACT

A vehicle communication control device that communicates with a plurality of vehicles, the vehicle communication control device including: a database generated from data acquired from the vehicles; and a control unit that controls data acquired from the vehicles based on information regarding a state of an own vehicle acquired from the vehicles and a completeness of the database.

11 Claims, 5 Drawing Sheets

COMMUNICATION UNIT ~ 110

ACQUISITION UNIT ~ 120

CONTROL UNIT ~ 130

DIGITAL TWIN ~ 140

COMMUNICATION QUALITY MAP DB ~ 150

~ 100

VEHICLE COMMUNICATION CONTROL DEVICE

COMMUNICATION UNIT ~ 210

REQUESTING/ ACQUISITION UNIT ~ 220

CONTROL UNIT ~ 230

SENSOR UNIT ~ 240

~ 200

VEHICLE

VEHICLE COMMUNICATION CONTROL DEVICE, SYSTEM, AND METHOD

CROSS-REFERENCE TO RELATED APPLICATION

This application claims priority to Japanese Patent Application No. 2022-122572 filed on Aug. 1, 2022, incorporated herein by reference in its entirety.

BACKGROUND

1. Technical Field

The present disclosure relates to a vehicle communication control device that controls communication with a vehicle, and the like.

2. Description of Related Art

Japanese Unexamined Patent Application Publication No. 2014-003355 (JP 2014-003355 A) discloses a road-to-vehicle communication system capable of reserving allocation of a communication resource possessed by a communication base station in accordance with the movement of a vehicle. It is stated that this road-to-vehicle communication system predicts the time period during which a vehicle will pass through the communication regions of multiple communication base stations based on the vehicle's planned travel route, and performs reservation so as to allocate the communication resources of the communication base stations that correspond to the predicted passage time period to the vehicle.

Further, Japanese Unexamined Patent Application Publication No. 2009-188883 (JP 2009-188883 A) discloses a vehicle communication device that optimizes a communication base station that communicates and a mode of communication according to the communication resource status of a communication base station (relay station). This vehicle communication device is described as controlling communication with a center based on communication load status information for each communication region covered by a communication base station.

SUMMARY

As the number of vehicles communicating with communication base stations increases, or as the amount of data communicated between the communication base stations and the vehicles increases, there is a possibility of a state in which communication resources become insufficient and communication between the vehicles and the communication base stations become insufficient occurs. For this reason, there is room for further study on methods of allocating communication resources in communication between a plurality of vehicles and communication base stations.

The present disclosure has been made in view of the above problems, and an object of the disclosure is to provide a vehicle communication control device and the like that can suppress a shortage of communication resources in communication between a plurality of vehicles and a communication base station.

In order to solve the above problems, one aspect of the disclosed technology is a vehicle communication control device that communicates with a plurality of vehicles, the vehicle communication control device including: a database generated from data acquired from the vehicles; and a control unit that controls the data acquired from the vehicles based on information regarding a state of an own vehicle acquired from the vehicles and a completeness of the database.

According to the vehicle communication control device and the like of the present disclosure, optimal data communication can be performed between a plurality of vehicles and a communication base station while suppressing lack of communication resources.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

When a plurality of vehicles performs data communication with a communication base station at the same time, a vehicle communication control device of the present disclosure dynamically controls a communication resource (or communication resources including bands and lines) of a communication base station allocated to each of the vehicles, based on a completeness of a digital twin and a communication quality of a communication region of the communication base station. This control suppresses a lack of the communication resources in communication between the vehicles and the communication base station, and realizes optimum data communication.

Hereinafter, an embodiment of the present disclosure will be described in detail with reference to the drawings.

EMBODIMENT

Configuration

Figure 1:
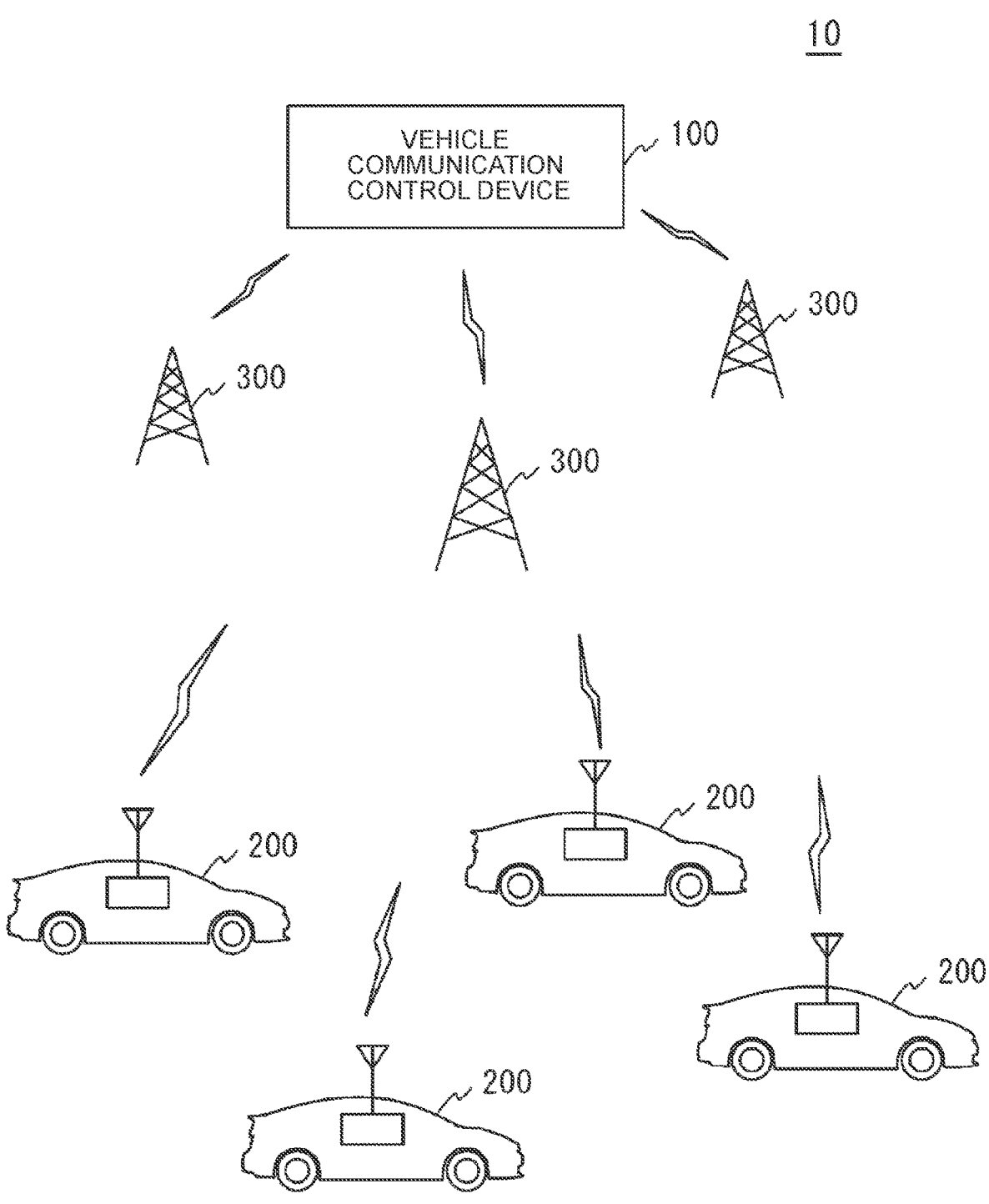
FIG. 1 is a schematic configuration diagram of a digital twin system including a vehicle communication control device according to an embodiment of the present disclosure.

FIG. 1 is a block diagram showing an overall configuration example of a digital twin system 10 including a vehicle communication control device 100 according to an embodiment of the present disclosure. The digital twin system 10 illustrated in FIG. 1 includes the vehicle communication control device 100 and a plurality of vehicles 200. The vehicle communication control device 100 and the vehicles 200 are communicably connected via a plurality of communication base stations 300.

(1) Vehicle Communication Control Device

The vehicle communication control device 100 is configured to communicate with the vehicles 200 via the communication base stations 300. This vehicle communication control device 100 can suitably control a communication state of data related to the generation of a digital twin 140 described later that is acquired from the vehicles 200, based on information related to the state of the own vehicle acquired from the vehicles 200. The vehicle communication control device 100 is, for example, a cloud server configured on the cloud.

Figure 2:
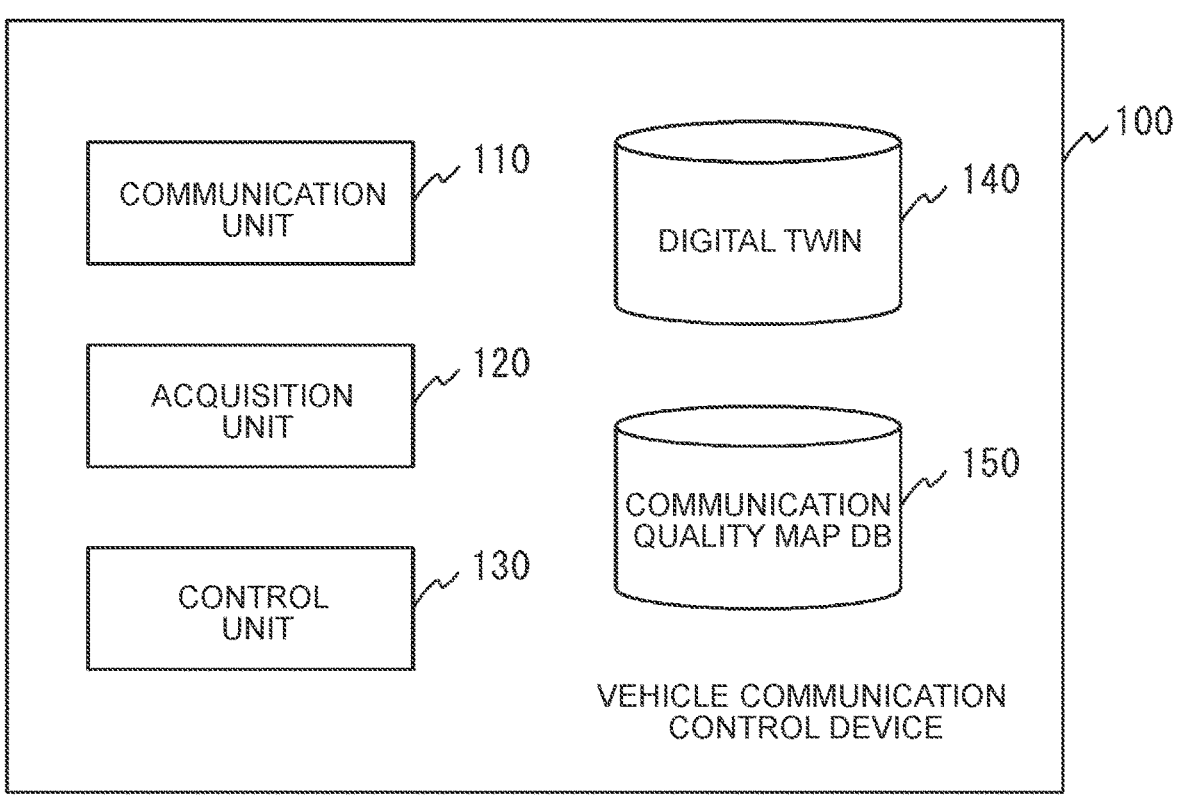
FIG. 2 is a functional block diagram of a vehicle communication control device.

FIG. 2 is an example of a functional block diagram of the vehicle communication control device 100. The vehicle communication control device 100 illustrated in FIG. 2 includes a communication unit 110, an acquisition unit 120, a control unit 130, a digital twin 140, and a communication quality map database (DB) 150. The vehicle communication control device 100 typically includes a processor such as a central processing unit (CPU), a memory such as a random access memory (RAM), a readable/writable storage medium such as a hard disk drive (HDD) or a solid state drive (SSD), an input output interface, and the like. All or part of the functions performed by the communication unit 110, the acquisition unit 120, and the control unit 130 are realized by the processor reading out and executing a program stored in the memory.

The communication unit 110 communicates with a plurality of vehicles 200 via a plurality of communication base stations 300, and respectively receives from the vehicles 200, a request regarding a predetermined service (desired route, cloud service, etc.), information regarding a state of the vehicle (position, speed, driving direction, etc. of the vehicle), data regarding the generation of the digital twin 140 (data regarding the vehicle surroundings, etc.), data accumulated in the communication quality map database 150 (data regarding communication quality, etc.), and the like. Further, the communication unit 110 communicates with the plurality of vehicles 200 via the plurality of communication base stations 300 and respectively transmits to the plurality of vehicles 200, communication-related information (data regarding communication resource allocation, requested vehicle state, etc.) and information regarding control instructions (vehicle control display, warning display, traffic information provision, etc.).

The acquisition unit 120 acquires information on the state of the own vehicle and data on generation of the digital twin 140, among various information and data received by the communication unit 110 from the multiple vehicles 200 (first acquisition unit). Also, the acquisition unit 120 acquires information on the communication quality of the communication region of each communication base station 300 (second acquisition unit). Data involved in generating the digital twin 140 is utilized to generate the digital twin 140. Information on the state of the host vehicle is used in the control unit 130. Information on the communication quality of the communication region is stored in the communication quality map database 150.

The control unit 130 controls data related to generation of the digital twin 140 received from the plurality of vehicles 200 by the communication unit 110, based on the information regarding the state of the own vehicle acquired by the acquisition unit 120 and the completeness of the digital twin 140. Specifically, the control unit 130 performs control to dynamically change allocation of communication resources used for data communication between vehicles 200 and communication base station 300, for each of the plurality of vehicles 200. This change is made by increasing or decreasing the amount of data to be received or by increasing or decreasing the communication frame to be used. The control performed by the control unit 130 and the degree of completeness of the digital twin 140 will be described later.

The digital twin 140 is a storage device (database) for reproducing a virtual world (virtual space) that is time synchronized with the real world (real space) on a cloud computer, by data regarding the current and past vehicle data acquired from the vehicles 200 being updated in real time and stored. With this digital twin 140 it is possible to generate a traffic digital twin in which all the objects (moving objects/stationary objects) on and traffic conditions of a traveling path in a place (road or parking lot) in which vehicles participating in the digital twin system 10 including the plurality of vehicles 200 can travel are replicated. Information included in the data stored by the digital twin 140 can show as an example, vehicle information (VIN, etc.), information on other vehicle traffic (including bicycles, pedestrians, etc.), map information, time information (time stamp), location information (GPS latitude/longitude), and trajectory information (vehicle speed, direction, etc.) that is a traveling track.

In this digital twin 140, when generating the traffic digital twin, the completeness x is defined based on the degree of adequacy of the stored data (the degree of lack of data) and the real-time nature of the actual traffic state. As an example, the completeness x can be obtained as a value ($0 \leq x \leq 1$) from the minimum value "0" to the maximum value "1" according to the following formula [1].

$$\text{Completeness } x = \text{actual reproduction area}/(\text{entire region} - \text{non-reproduced region}) \times \text{coefficient } a \times \text{coefficient } b \qquad [1]$$

In formula [1] above, the entire region indicates the entire area of the traffic digital twin that can be generated from the data acquired from the vehicle 200. The non-reproduced region indicates the total area of places such as buildings and green spaces where the vehicle 200 cannot travel (cannot enter), that is, places that are not to be reproduced in the traffic digital twin. Therefore, this "entire region–non-reproduced region" can be said to be the total region of the places (roads, parking lots, etc.) that are essential for the generation of the traffic digital twin for the provision of cloud services, that is, the reproduced region. Among the reproduced region described above (entire region–non-reproduced region), the actual reproduce region indicates the total area of a region in which the vehicle position is reproduced with the time synchronism (time difference with the real world) being equal to or less than the reference value (for example, 50 milliseconds), the object on the traveling road is be reproduced, and remote driving or control is not hindered. The coefficient a is the ratio of the region where the vehicle position is reproduced with the time synchronism equal to or less than the reference value to the region where the vehicle position is reproduced with the time synchronism exceeding the reference value (region where the degree of completeness is reduced). A region where the vehicle position is reproduced with the time synchronism exceeding the reference value is a region in which the completeness x is lowered, and is a region that may interfere with remote driving or control. The reference value for determining the ratio may be set stepwise, or the coefficient of each region divided by each reference value may be weighted. For example, reference values of 50 ms, 100 ms, and 200 ms can be set, weighting can be set to "low" when the time synchronization is in the range of 50 to 100 ms, weighting can be set to "intermediate" when the time synchronization is in the range of 100 to 200 ms, and weighting can be set to "large" when the time synchronization exceeds 200. The coefficient b is the ratio of a region where the presence or absence of an object is clear to a region where the presence or absence of an object is unclear (region in which the completeness is lowered). The region where the presence or absence of an object is unclear is a region where there is no information about the presence or absence of an object such as a vehicle or a pedestrian and the degree of completeness x is lowered, and is a region where remote driving or control is impossible.

For example, when the degree of completeness x of the digital twin 140 equals 1, it means that the traffic state in that scene can be perfectly reproduced. An example of a cloud service that can be performed when the degree of completeness x equals 1 is to instruct traffic control from the vehicle communication control device 100 side (remote vehicle control, etc.). Also, for example, when the degree of completeness x of the digital twin 140 is 0.5, there is uncertainty in reproducing the traffic state in that scene (presence of some vehicles are unknown, real-time performance due to time synchronization is lacking, etc.). As possible cloud service at this degree of completeness x equals 0.5, limited content such as calling attention to the vehicle surroundings (such as an object jumping out of a blind spot) due to it being difficult to instruct traffic control from the vehicle communication control device 100 side can be shown as an example. Further, for example, when the degree of completeness x of the digital twin 140 equals 0.1, it means that the traffic conditions in that scene cannot be reproduced. Examples of cloud services that can be performed at this degree of completeness x=0.1 include limited content such as providing information on current traffic congestion and information on available parking lots based on location information such as traveling locations.

It should be noted that the reference value, weighting, and the like used to determine the degree of completeness x of the digital twin 140 described above can be appropriately set according to the application and requirements of the digital twin 140. In addition, depending on the application and requirements of the digital twin 140, the rate of reproducibility of weather such as sunny and rainy may be added as a coefficient.

A communication quality map database (DB) 150 is a storage device that stores a plurality of pieces of information and data relating to the communication quality of the communication region of the communication base stations 300 provided by the plurality of vehicles 200 acquired by the acquisition unit 120 via the communication unit 110. In this communication quality map database 150, data measurement times, GPS latitude/longitude, names of communication line service providers, cell identification (IDs) of the plurality of communication base stations 300, etc. are stored statistically as past data in a map form that corresponds to map information of a road. The communication quality map database 150 also stores as communication quality information, information provided by the plurality of communication base stations 300 (received signal strength RSSI of the entire band received by the antenna, reference signal received power RSRP indicating radio wave strength from the base station, radio wave reception quality (RSRQ) serving as a measure of the line congestion state, a signal to interference noise ratio RSSNR, etc.), effective speed (upper and lower average/peak throughput), communication delay time, packet loss, etc.

(2) Vehicle

The plurality of vehicles 200 is mobility configured to be able to communicate with the vehicle communication control device 100 via the plurality of communication base stations 300. The plurality of vehicles 200 can provide the vehicle communication control device 100 with information regarding the state of the own vehicle and data necessary for generating the digital twin 140. The information about the state of the own vehicle includes the position of the vehicle, the speed of the vehicle, the direction of travel of the vehicle, and the like. The data necessary to generate the digital twin 140 includes videos of the front and rear of the vehicle 200, sonar values around the vehicle 200, and the like.

Figure 3:
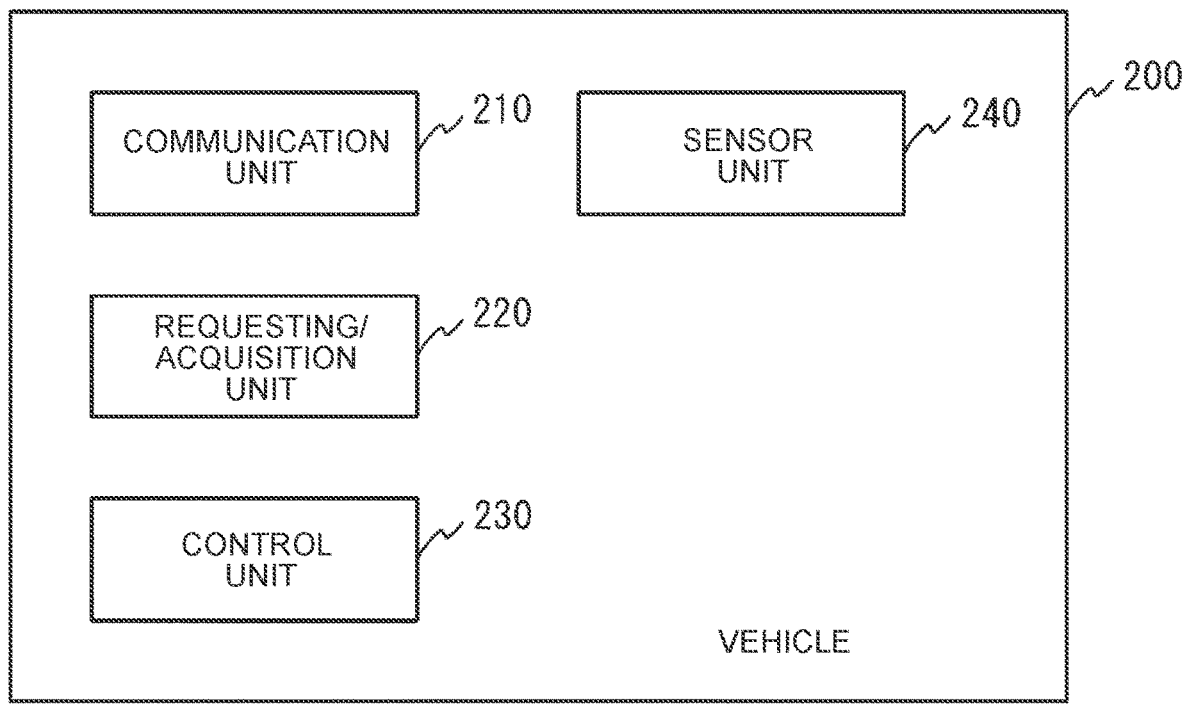
FIG. 3 is a functional block diagram of a vehicle.

FIG. 3 is an example of a functional block diagram of vehicle 200. The vehicle 200 illustrated in FIG. 3 includes a communication unit 210, a request/acquisition unit 220, a control unit 230, and a sensor unit 240. These configurations can be configured typically as an electronic control unit (ECU) including a processor such as a CPU, a memory such as RAM, a readable/writable storage medium such as a hard disk drive or solid state drive, and an input/output interface. This electronic control unit can realize all or some of the functions of the communication unit 210, the request/acquisition unit 220, and the control unit 230 when the processor reads and executes the program stored in the memory.

The sensor unit 240 is configured to acquire data related to generation of the digital twin 140 of the vehicle communication control device 100. The data related to the generation of this digital twin 140 is data related to other vehicles, buildings, pedestrians, etc. existing around the vehicle 200 other than the own vehicle. In this embodiment, video data in which the front of the vehicle 200 is captured, image data in which the rear of the vehicle 200 is captured, and rear sonar data of the vehicle 200 that are data related to the surroundings of the vehicle 200 are used as the data related to the generation of the digital twin 140. As the sensor unit 240, devices such as a camera sensor for acquiring information indicating the state around the vehicle 200 and information indicating the state of the vehicle 200, radar (laser radar, millimeter wave radar, etc.), laser imaging detection and ranging (LiDAR), ultrasonic sonar, etc. are mounted on a vehicle 200.

The communication unit 210 communicates with the vehicle communication control device 100 via the plurality of communication base stations 300, and respectively transmits to the vehicle communication control device 100, a request regarding a predetermined service (desired route, cloud service, etc.) from the plurality of vehicles 200, and information regarding a state of the vehicle (position, speed, driving direction, etc. of the vehicle), data regarding the generation of the digital twin 140 (data regarding the surroundings of the vehicle, etc.), and data accumulated in the communication quality map database 150 (data regarding communication quality, etc.), and the like. The information about the state of the own vehicle may include the operation state of the direction indicator, accelerator operation amount/brake braking amount, acceleration/deceleration, shift range (D/B/R) state, steering angle, traveling lane, and the state of the traffic light of oncoming lane, etc. Further, the communication unit 210 communicates with the vehicle communication control device 100 via the plurality of communication base stations 300 and respectively receives from the vehicle communication control device 100, communication-related information (data regarding communication resource allocation, requested vehicle state, etc.) and information regarding control instructions (vehicle control display, warning display, traffic information provision, etc.). Each of the plurality of vehicles 200 communicates with the vehicle communication control device 100 via, for example, the communication base station 300 closest to the own vehicle or the communication base station 300 with the best communication quality.

The request/acquisition unit 220 requests the communication unit 210 to transmit a request regarding a predetermined service and information regarding the state of the own vehicle. This request may be implemented by an application implemented in vehicle 200, for example. In addition, the request/acquisition unit 220 at least acquires information on communication and information on control instructions among various information that the communication unit 210 receives from the vehicle communication control device 100. Further, the request/acquisition unit 220 acquires data related to generation of the digital twin 140 (data related to the surroundings of the vehicle) from the sensor unit 240.

Based on the communication-related information acquired by the request/acquisition unit 220, the control unit 230 performs control corresponding to the communication resource allocated for the data related to the generation of the digital twin 140 acquired by the request/acquisition unit 220 and corresponding to data on the information related to the requested surroundings of the vehicle. The control unit 230 instructs the communication unit 210 to transmit the controlled data to the vehicle communication control device 100. This control or instruction may be implemented by an application implemented in vehicle 200, for example. Video data captured by the sensor unit 240 and measured sonar values can be used as the data related to the generation of the digital twin 140. The control performed by the control unit 230 will be described later.

Although not shown, various functions such as a clock function, a global positioning system (GPS) reception function, a vehicle control input/output function for executing traffic control, and a navigation function that performs a route search/destination input (route setting) are installed in the vehicle 200.

(3) Communication Base Station

The communication base stations 300 are relayers that relay communication performed between the vehicles 200 and vehicle communication control device 100. This communication base station 300 communicates with the plurality of vehicles 200 using predetermined communication resources. In response to a request from the vehicle communication control device 100, the communication base station 300 can transmit (answer) information on communication quality to the vehicle communication control device 100 such as the received signal strength RSSI of the entire band received by the antenna, the reference signal received power RSRP indicating the strength of the radio wave from the base station, the radio wave reception quality RSRQ that is a measure of the line congestion state, and the signal to interference noise ratio RSSNR representing the signal quality.

Control

Figure 4:
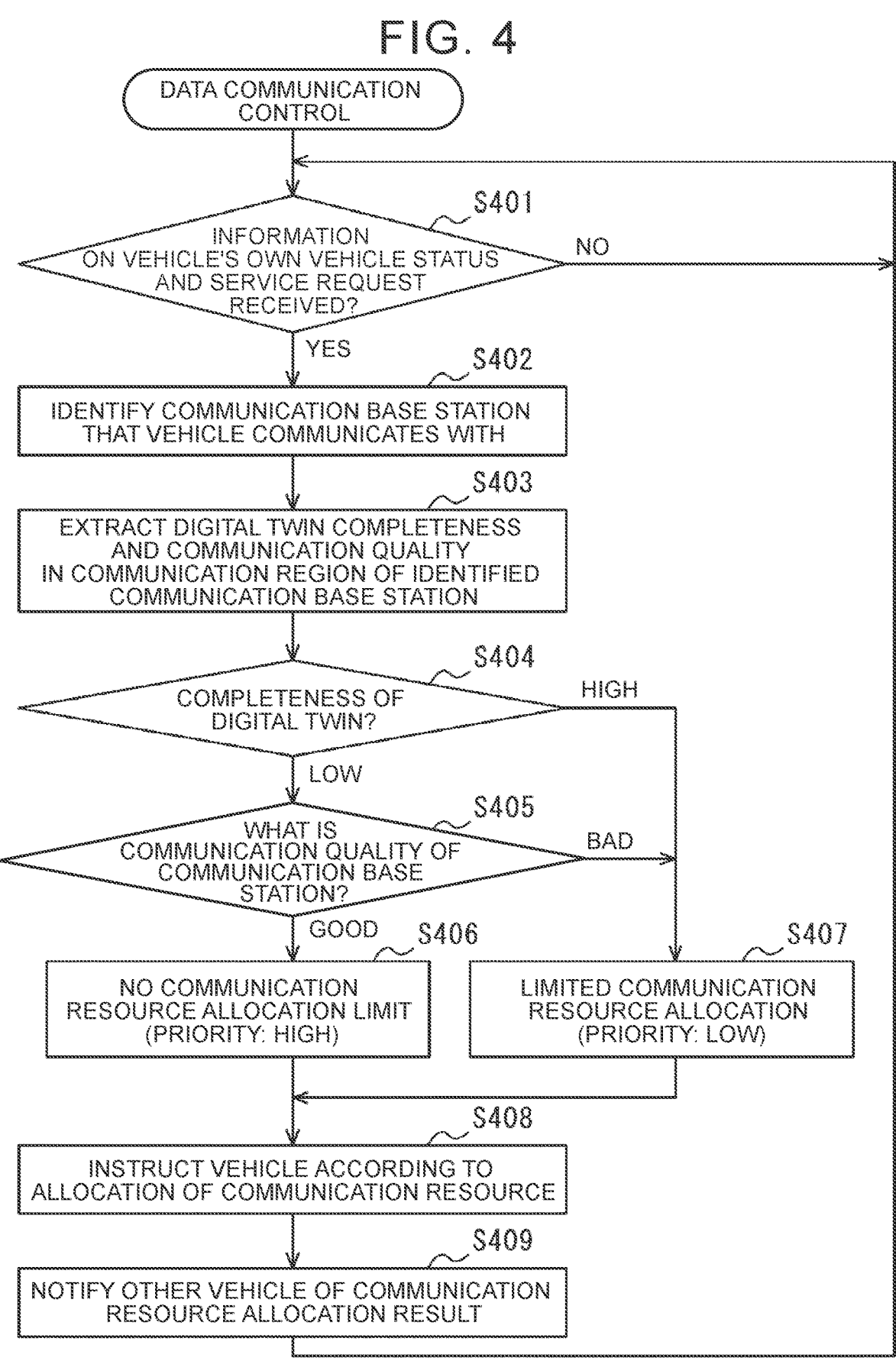
FIG. 4 is a processing flowchart of data communication control executed by the vehicle communication control device.
Figure 5:
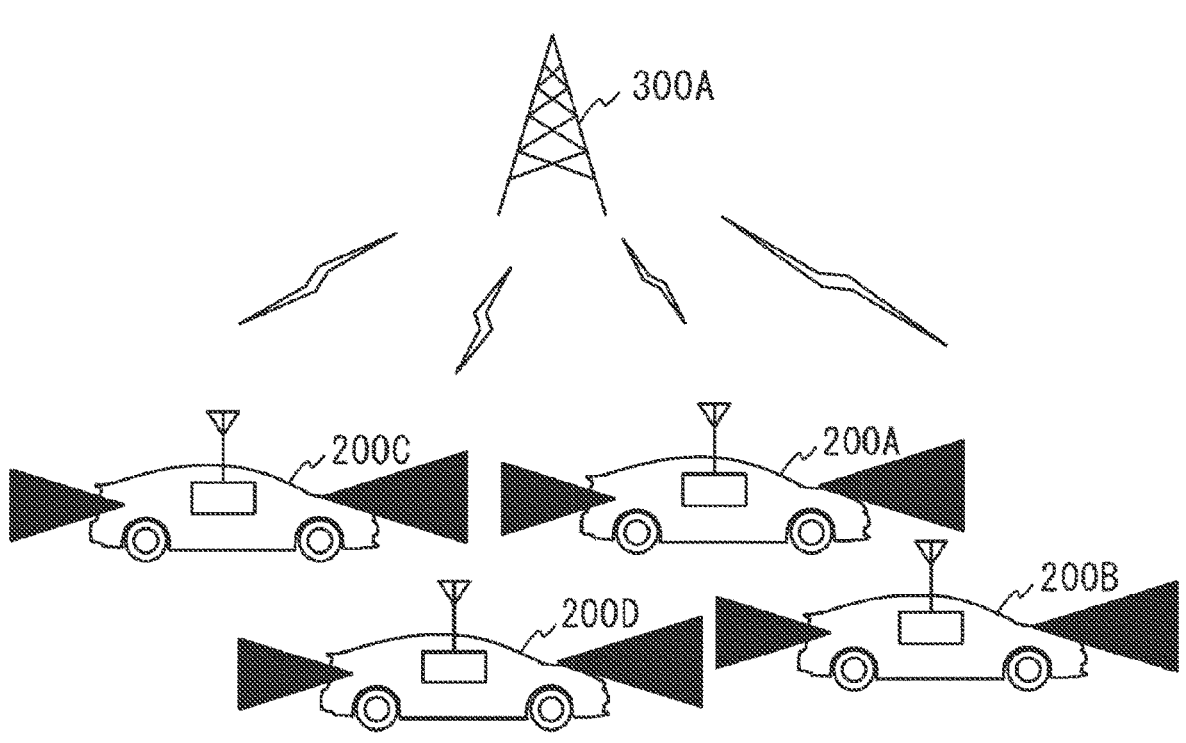
FIG. 5 is an image diagram of communication resource allocation in communication between the vehicle and a communication base station.
Figure 6:
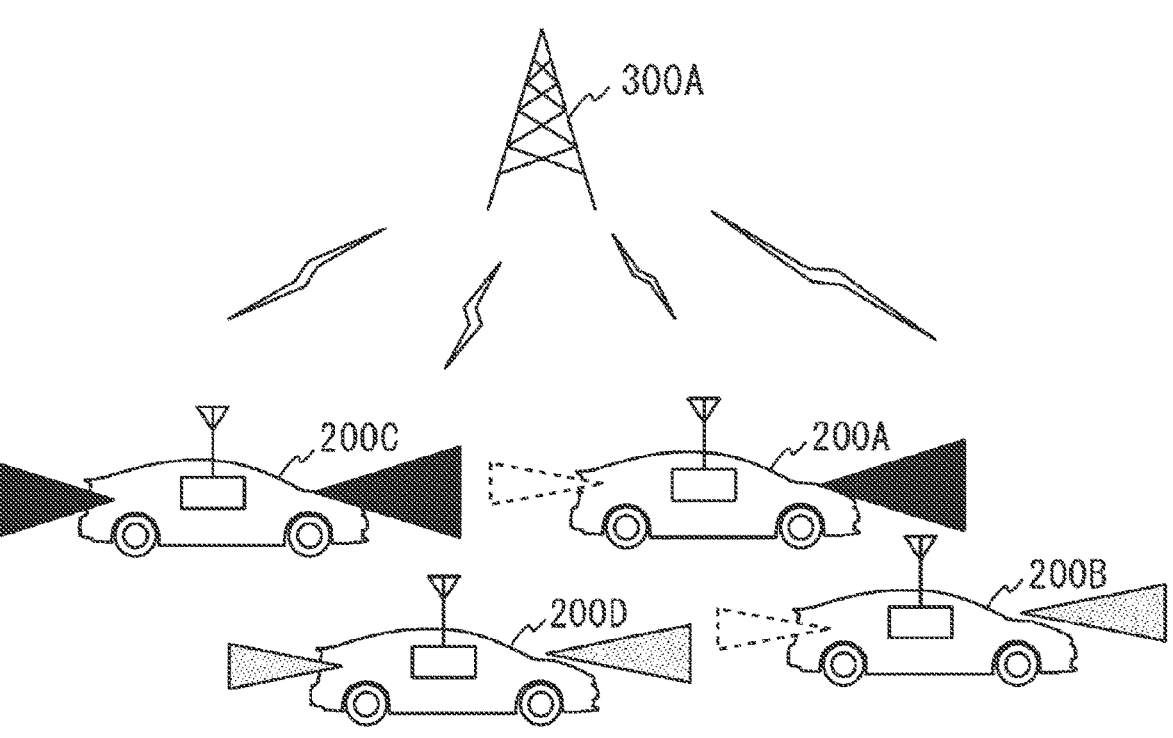
FIG. 6 is an image diagram of communication resource allocation in communication between the vehicle and the communication base station.
Figure 7:
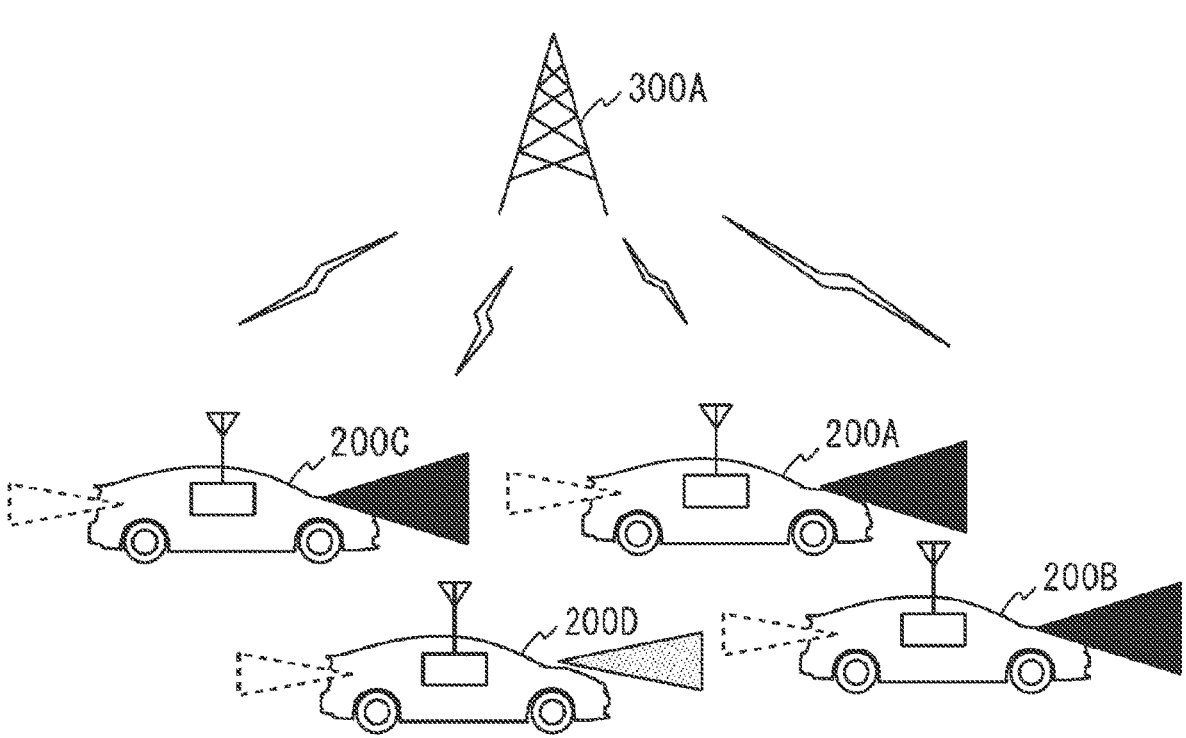
FIG. 7 is an image diagram of communication resource allocation in communication between the vehicle and the communication base station.

Next, with reference to FIG. 4 to FIG. 7, control executed by the vehicle communication control device 100 according to the embodiment of the present disclosure will be described. FIG. 4 is a flowchart for explaining the procedure of data communication control executed by each component of the vehicle communication control device 100. FIGS. 5 to 7 are image diagrams for explaining a method of allocating communication resources when four vehicles 200A, 200B, 200C, and 200D communicate with one communication base station 300A.

(1) Process Flow

The data communication control illustrated in FIG. 4 is individually executed to each of the vehicles 200A, 200B, 200C, and 200D in which communication between the vehicle communication control device 100 is established via the communication base 300A, as shown in FIGS. 5 to 7.
Step S401
The vehicle communication control device 100 determines whether it has received information about the state of the own vehicle and a service request from any of the vehicles 200A, 200B, 200C, and 200D. In this flow, a case will be described below in which information about the state of the own vehicle and the service request are received from the vehicle 200A. The information about the state of the own vehicle includes at least the position of the vehicle 200A. When the vehicle communication control device 100 receives the information about the state of the own vehicle and the service request from the vehicle 200A (step S401, yes), the process proceeds to step S402.
Step S402
The vehicle communication control device 100 identifies the communication base station 300A with which the vehicle 200A communicates. This identification of the communication base station 300A can be performed by referring to the communication quality map database 150 and based on the cell ID of the communication base station 300 attached to the information about the state of the own vehicle acquired from the vehicle 200A. When the communication base station 300A with which the vehicle 200A communicates is specified by the vehicle communication control device 100, the process proceeds to step S403.
Step S403
The vehicle communication control device 100 refers to the digital twin 140 and the communication quality map database 150 to extract the completeness and communication quality of the digital twin 140 in the communication region (coverage region) of the communication base station 300A identified in step S402. After the vehicle communication control device 100 extracts the completeness and communication quality of the digital twin 140 in the communication region of the communication base station 300A, the process proceeds to step S404.
Step S404
The vehicle communication control device 100 determines the completeness x of the digital twin 140. More specifically, when the completeness x of the digital twin 140 is less than 1 ($x<1$), the vehicle communication control device 100 determines whether the condition that an effective increase in the degree of the completeness x of the digital twin 140 can be expected (contributes to the improvement of the degree of completeness x) if the vehicle communication control device 100 receives data related to the generation of the digital twin 140 from the vehicle 200A is satisfied. It is conceivable that a case in which an effective increase in the completeness x cannot be expected is a case where the data of the vehicle 200A overlaps with the data of the other vehicles 200B, 200C, and/or 200D, and the case where the data of the vehicle 200A is not a missing data item in the digital twin 140. The determination of whether it is effective to increase the degree of completeness x of the digital twin 140 can be arbitrarily set in accordance with the amount of change and rate of change from the current state of the degree of completeness x when the data items of the digital twin 140 are grasped and data of the vehicle 200A is imported.

If the vehicle communication control device 100 determines that the completeness x of the digital twin 140 is still low and that the data of the vehicle 200A can be expected to effectively increase the completeness x (step S404, low), the process proceeds to step S405. If the vehicle communication control device 100 determines that the completeness x of the digital twin 140 is high to some degree and that the data of the vehicle 200A cannot be expected to effectively increase the completeness x (step S404, high), the process proceeds to step S407.

Step S405

The vehicle communication control device 100 determines the communication quality in the communication region of communication base station 300A. For example, based on the various data stored in the communication quality map database 150, the vehicle communication control device 100 can determine that the communication quality is good when the communication delay time in the communication region is relatively short and can determine that the communication quality is poor when the communication delay time in the communication region is relatively long.

When the vehicle communication control device 100 determines that the communication quality in the communication region of the communication base station 300A is good (step S405, good), the process proceeds to step S406. On the other hand, when the vehicle communication control device 100 determines that the communication quality in the communication region of the communication base station 300A is bad (step S405, bad), the process proceeds to step S407.

Step S406

The vehicle communication control device 100 sets without limitation, an allocation of communication resources used by the vehicle 200A for data communication with the communication base station 300A. That is, the communication between the vehicle 200A and the communication base station 300A is prioritized (priority is increased) than the communication with the other vehicles 200B, 200C, and 200D. As an example of unrestricted allocation of communication resources (higher priority) in the present embodiment, allowing transmission of high-quality video data acquired by the sensor unit 240 of the vehicle 200A as it is, or adding a value of a rear sonar can be indicated. With this control, transmission data of the vehicle 200A (for example, the data items that are lacking in the digital twin 140) in which an effective increase the degree of completeness of the digital twin 140 can be expected can be received by the vehicle communication control device 100 with priority over transmission data of the other vehicles 200B, 200C, and 200D. When the vehicle communication control device 100 sets the allocation of the communication resource to be used by the vehicle 200A for data communication with the communication base station 300A without restriction, the process proceeds to step S408.

Step S407

The vehicle communication control device 100 sets with limitation, an allocation of communication resources used by the vehicle 200A for data communication with the communication base station 300A. That is, the communication with some or all of the other vehicles 200B, 200C, and 200D is prioritized (lower priority) than the communication between the vehicle 200A and the communication base station 300A. As an example of restricting the allocation of communication resources (lowering the priority) in the present embodiment, allowing transmission of video data of low quality in which a part of the high image quality video data acquired by the sensor unit 240 of the vehicle 200A is thinned out or deleted can be indicated. With this control, the vehicle communication control device 100 can prioritize and receive transmission data of the other vehicles 200B, 200C, and 200D in which an effective increase in the completeness can be expected in the digital twin 140 (for example, becoming missing data items in the digital twin 140), more than the transmission data of the vehicle 200A in which an effective increase in the completeness cannot be expected (for example, becoming overlapping data in the digital twin 140). When the vehicle communication control device 100 sets the allocation of the communication resource to be used by the vehicle 200A for data communication with the communication base station 300A with restriction, the process proceeds to step S408.

Step S408

The vehicle communication control device 100 instructs the vehicle 200A in accordance with the result of communication resource allocation set in step S406 or step S407. This instruction includes, in addition to specifying the bandwidth and communication frame that vehicle 200A can use for communication with communication base station 300A regarding allocation of communication resources, information on the image quality (high quality or low quality) of video data requested to vehicle 200A and the presence of the sonar value. When the vehicle communication control device 100 issues an instruction to the vehicle 200A according to the communication resource allocation result, the process proceeds to step S409.

Step S409

The vehicle communication control device 100 notifies the other vehicles 200B, 200C, and 200D communicating via the same communication base station 300A of the result of communication resource allocation to vehicle 200A. When the vehicle communication control device 100 notifies the other vehicles 200B, 200C, and 200D of the allocation result of the communication resource for the vehicle 200A, the process proceeds to step S401, and this data communication control is repeated.

(2) Specific Example

A specific example of allocating the communication resources will be described with reference to FIGS. 5 to 7. In FIGS. 5 to 7, the four vehicles 200A, 200B, 200C, and 200D, for example, communicate with the communication base station 300A while traveling rightward on a two-lane road in a close arrangement as shown in the figure.

FIG. 5 is a drawing showing an image in which high-definition video data of the front and rear of the vehicle (represented by triangles colored in black in the figure) as data related to the generation of the digital twin 140 are transmitted from each of the vehicles 200A, 200B, 200C, and 200D before communication resource allocation control is performed to the same communication base station 300A.

When the communication base station 300A has sufficient communication resources, as shown in FIG. 5, all of the vehicles 200A, 200B, 200C, and 200D can transmit high-quality video data of both the front and rear of the vehicle to the base station 300A at the same time. This high-definition video data is data (communication volume: large) that can greatly contribute to grasping the traffic environment at the location by means of high-definition threedimensional information. By acquiring as much information as possible from the vehicles 200 in this way, the vehicle communication control device 100 can further improve the degree of completeness of the digital twin 140 and bring it closer to "1."

However, with the communication resources of the communication base station 300A, when all of the vehicles 200A, 200B, 200C, and 200D cannot transmit high-quality video data of both the front and rear of the vehicle to the communication base station 300A, the communication resource allocation control for each of the vehicles 200 is performed by the data communication control described above.

FIG. 6 is a diagram showing an image of vehicle video data to be transmitted to the communication base station 300A set based on the communication resource allocation results for each of the vehicles 200A, 200B, 200C, and 200D. In the example of FIG. 6, in the vehicle 200A, high-definition video data is restricted only to the front of the vehicle, and the rear of the vehicle is restricted to sonar values (represented by dotted-line triangles in the figure). The vehicle 200B is limited to low-quality video data (represented by hatched triangles in the figure) in front of the vehicle, and limited to sonar values in the rear of the vehicle. This high-definition video data is data (communication volume: intermediate) that can restrictedly contribute to grasping the traffic environment at the location by means of two-dimensional information. Also, the sonar value is only one-dimensional information that provides distance information between vehicles, and is data with a small amount of information and a low contribution rate (communication volume: small) for grasping the traffic environment. The vehicle 200C is instructed with high-quality video data both in front of the vehicle and the rear the vehicle (no restrictions), and is given priority over the other vehicles 200A, 200B, and 200D. The vehicle 200D is restricted to low image quality video data both in the front of the vehicle and the rear of the vehicle.

Such allocation of the communication resources is in principle based on the following concept. In the vehicle 200A and the vehicle 200C traveling in a forward and backward arrangement, it is possible to grasp the traffic environment behind the vehicle 200A from the image in front of the vehicle by the vehicle 200C. Therefore, since the value of the high-quality video data of the rear of the vehicle from the vehicle 200A is low, the rear of the vehicle in which the data amount is low is restricted to the sonar value. The rear of the vehicle 200A may be the high-quality video data, and the front of the vehicle 200C may be the sonar value. Moreover, in the vehicle 200A and the vehicle 200B, which travel almost side by side at the head of the convoy, most of the videos of the space in front of the vehicles overlap. Therefore, since the video data of the space in front of the vehicle 200A and the video data of the space in front of the vehicle 200B become redundant, the video data of the space in front of either the vehicle 200A or the vehicle 200B is restricted to low image quality video data (vehicle 200B in FIG. 6). The same way of thinking as described above is applied to the relationship between the vehicle 200B and the vehicle 200D that travel in a front-rear arrangement and the relationship between the vehicle 200C and the vehicle 200D that travel side by side.

As a result of allocating communication resources to each vehicle 200 (FIG. 6), if there is sufficient communication resources, etc., allocation of the communication resources may be further modified as shown in FIG. 7, based on the completeness of the digital twin 140. In the example of FIG.

7, the vehicle 200A sets high-quality video data for the space in front of the vehicle and sonar values for behind the vehicle, as in FIG. 6. For the vehicle 200B, the space in front of the vehicle is changed to high-quality video data, and behind the vehicle remains unchanged. In the vehicle 200C, only the space in front of the vehicle is set as high-quality video data, and behind the vehicle is changed to the sonar value. In the vehicle 200D, only the space in front of the vehicle is high-quality video data, and behind the vehicle is changed to the sonar value.

In the example of FIG. 7, since the data items of the space in front of the vehicle 200A and the vehicle 200B are insufficient and the completeness of the digital twin 140 at that location is low, the rear of each vehicle 200 in which the data item is satisfied is restricted to only the sonar value, and the communication resources that can be acquired due to this restriction are allocated to increasing the quality of the video data of the space in front of the vehicle by the vehicle 200B that is lacking as a data item. In this way, it is possible to execute balanced allocation corresponding to the demand for generating the digital twin 140 and perform data communication that makes the most of communication resources.

Information collected from multiple low-quality video data corresponds to information collected from one high-quality video data, and information collected from multiple sonar values corresponds to information collected from one low-quality video data. Therefore, by collecting multiple low-quality video data and a large number of sonar values, it is possible to contribute to grasping the traffic environment.

Operations, Effects, Etc

As described above, according to the vehicle communication control device 100 according to an embodiment of the present disclosure, when the vehicles 200 perform data communication with the communication base station 300 at the same time, the vehicle communication control device 100 dynamically controls the communication resources of the communication base station 300 allocated to each of the vehicles 200 (priority of communication by each of the vehicles 200) based on the completeness of the digital twin 140 and the communication quality of the communication region of the communication base station 300.

For example, when the transmission data of the vehicle 200A has a high degree of completeness of the digital twin 140 regarding this transmission data, and the collection demand of the transmission data of the vehicle 200A is low (the data items of the digital twin 140 are substantial), and when the transmission data of the vehicle 200A overlaps with the transmission data of the other vehicle 200B (redundant data), the allocation of the communication resource of this vehicle 200A is restricted.

With this control, it is possible to suppress the shortage of communication resources in communication between the plurality of vehicles 200 and the communication base station 300 from occurring. Thus, optimal data communication can be performed between the plurality of vehicles 200 and the communication base station 300 without putting pressure on the communication resources.

Although the embodiment of the present disclosure has been described above, the present disclosure can be applied to a vehicle communication control device, a method executed by a vehicle communication control device including a processor and a memory, a program for executing this method, a computer-readable non-transitory storage medium that stores a program, and a system equipped with a vehicle communication control device and a vehicle.

The vehicle communication control device of the present disclosure is useful when it is desired to perform optimum data communication between a plurality of vehicles and communication base stations without putting pressure on communication resources.

The invention claimed is:

1. A vehicle communication control device that communicates with a plurality of vehicles, the vehicle communication control device comprising:

a database generated from data acquired from the vehicles; and a control unit that controls the data acquired from the vehicles based on information regarding a state of a first vehicle acquired from the vehicles and a completeness of the database; wherein with respect to two or more vehicles sharing a communication resource, the control unit restricts communication with a vehicle other than a vehicle from which data that satisfies a predetermined condition regarding the completeness of the database being able to be acquired;

the data acquired from the vehicles is a video of vehicle surroundings; and the control unit restricts communication with the other vehicle by reducing an image quality of the video of the vehicle surroundings transmitted from the other vehicle.

2. The vehicle communication control device according to claim 1, wherein the control unit restricts the data acquired from the vehicle when the data that is able to be acquired from the vehicle does not satisfy a predetermined condition regarding the completeness of the database.

3. The vehicle communication control device according to claim 2, wherein the predetermined condition is that data that is able to be acquired from the vehicle corresponds to a data item lacking in the database.

4. The vehicle communication control device according to claim 1, further comprising a first acquisition unit that acquires, from the vehicles, the data controlled by the control unit and information regarding the state of the first vehicle including at least a position of the vehicle, wherein the control unit determines the two or more vehicles that share the communication resource based on positions of the vehicles.

5. The vehicle communication control device according to claim 4, wherein the control unit determines that vehicles that communicate with the same communication base station are the two or more vehicles sharing the communication resource.

6. The vehicle communication control device according to claim 5, further comprising a second acquisition unit that acquires information regarding communication quality of a communication region of the communication base station, wherein the control unit controls data acquired from the vehicles based on the information regarding the state of the first vehicle, the completeness of the database, and the information regarding the communication quality.

7. The vehicle communication control device according to claim 1, wherein the control unit restricts communication with the other vehicle by reducing a communication frame allocated to the other vehicle.

8. The vehicle communication control device according to claim 1, wherein the control unit executes control so as to be able to acquire only data with a high priority among a plurality of pieces of data held by the other vehicle in which communication is restricted.

9. The vehicle communication control device according to claim 1, wherein the database stores data for forming a digital twin that is time-synchronized with real space in virtual space.

10. A system comprising a plurality of vehicles and a vehicle communication control device that communicates with the vehicles, wherein the vehicle communication control device includes:

a database generated from data acquired from the vehicles; and a control unit that controls data acquired from the vehicles based on information regarding a state of a first vehicle acquired from the vehicles and a completeness of the database, wherein each of the vehicles executes communication with the vehicle communication control device under a control of the control unit;

with respect to two or more vehicles sharing a communication resource, the control unit restricts communication with a vehicle other than a vehicle from which data that satisfies a predetermined condition regarding the completeness of the database being able to be acquired;

the data acquired from the vehicles is a video of vehicle surroundings; and the control unit restricts communication with the other vehicle by reducing an image quality of the video of the vehicle surroundings transmitted from the other vehicle.

11. A method executed by a computer of a vehicle communication control device that includes a processor and a memory, that communicates with a plurality of vehicles, and that includes a database generated from data acquired from the vehicles, the method comprising:

acquiring information regarding a state of a first vehicle from the vehicles;

controlling data acquired from the vehicles based on the information regarding the state of the first vehicle and a completeness of the database;

with respect to two or more vehicles sharing a communication resource, restricting communication with a vehicle other than a vehicle from which data that satisfies a predetermined condition regarding the completeness of the database being able to be acquired;

the data acquired from the vehicles is a video of vehicle surroundings; and the control unit restricts communication with the other vehicle by reducing an image quality of the video of the vehicle surroundings transmitted from the other vehicle.

* * * * *